Patented Oct. 24, 1944

2,361,286

UNITED STATES PATENT OFFICE 2,361,286

PHOSPHORIC ACID ESTERS OF GLYCEROL ETHERS AND THEIR MANUFACTURE

Adolf Grün, Basel, Switzerland, assignor to the firm J. R. Geigy, A.-G., Basel, Switzerland No Drawing. Application December 9, 1940, Serial No. 369,355. In Switzerland December 28, 1939

1 Claim. (Cl. 260—461)

It has been found that phosphoric acid esters of glycerol ethers, especially of those which contain at least one unsaturated ether group, possess valuable therapeutic properties. The new compounds are made in a usual manner for example by esterifying glycerol ethers which may still contain any alkyl- or aryl group besides one of the mentioned ether radicals, with phosphoric acids or reactive phosphorus compounds.

In introducing the phosphate radical for example, a glycerol ether is reacted with phosphorus pentoxide, phosphoric acids, phosphorus halides, ethyl metaphosphate, phosphorus oxychloride, the dichlorides of monomethyl-, -ethyl-, -isopropyl-, -allyl-, bromallyl-phosphoric acid or some other reagent capable of yielding the elements of phosphoric acid.

Neutral or acid esters can thus be prepared in dependence of the molecular proportions of the used phosphorus compounds and glycerol ethers. Acid esters can be converted into neutral ester salts by means of organic or inorganic bases. For the choice of the bases different points of view may be considered, thus on the one hand the degree of water-solubility which the final product must have, on the other hand certain physiological or pharmocological properties of the bases.

The following examples illustrate the invention, without limiting it thereto, the parts being by weight unless otherwise stated.

EXAMPLE 1

*1-ethoxy-3-phenoxy-propanol-2-phosphoric acid ester*

30 parts of 1-ethoxy-3-phenoxy-propanol-2 are caused, while vigorously stirring, to drop into 100 parts of phosphorus oxychloride, whereby the temperature of the mixture is finally raised up to 40° C. and kept thereon for 4 hours. The excess of phosphorus oxychloride is distilled off in vacuo at 50° C. at the maximum, the residue subjected to hydrolysis with the double to threefold weight of ice and water, then an excess of potassium hydroxide of 20 per cent strength is added thereto, the solution is shaken out with ether and the acid phosphoric acid ester extracted, after acidifying, from the aqueous solution.

The new compound forms a highly viscous liquid which is easily soluble in water, alcohols and ether. It reacts as a di-basic acid and produces with alkalies, ammonia, amines, furthermore with lime, barium hydroxide and the like soluble salts which in aqueous solution are hydrolytically split for a small part. The di-sodium and the di-potassium salts react feebly alkaline to litmus in aqueous solution, whilst the salts from 1 molecule of ester-acid and 2 molecules of diethylamine or 2 molecules of 1-phenyl-2:3-dimethyl-4-dimethylamino-pyrazolone-5 show a weakly acid reaction to litmus.

EXAMPLE 2

1-isopropyloxy-3-phenoxy-propanol-2, made from epiphenyline and isopropyl alcohol, B. P. at 16 mm. 156.5 to 157° C., is transformed into the phosphoric acid ester dichloride under the reaction conditions indicated in Example 1 and the phosphorus acid ester dichloride thus obtained is converted into the ester-acid. The new compound resembles in its constitution and behaviour the ethyl-homologous. As di-basic acid the ester-acid is characterised by the neutralisation number of 380 (calculated 386).

Allyl phenyline, bromallyl phenyline, dibromallyl phenyline, isobutyl guaiacoline, 1-isoamyl-3-o-, m- or p-tolyloxy-propanol-2 as well as other halogen derivatives and substitution products of alkyl-aryl-ethers of the glycerol show, when caused to react with phosphorus oxychloride, the same behaviour as the not substituted starting products.

EXAMPLE 3

1-tetrahydrofurfuroxy-3-phenoxy-2-propanol, made from epiphenyline and tetrahydrofurfur-alcohol (B. P. at 13 mm. 204–205° C., B. P. at 2 mm. 177–178° C.) is caused to react with phosphorus oxychloride in excess, the intermediate product is subjected to hydrolysis by means of ice-cold water and the resulting free phosphoric acid ester is intermixed with caustic soda lye of 20 per cent strength up to litmus-alkaline reaction and then with sodium carbonate up to phenolphthalein-alkaline reaction. Then a small quantity of unaltered starting material is extracted, the solution is acidified by adding phosphoric acid of 85 per cent strength, the purified phosphoric acid ester is extracted by means of benzene and the solution thus obtained is dried and the benzene distilled off. The remaining substance is a pure ester consisting of a mixture of primary ester $R-O-PO_3H_2$ and secondary ester $(RO)_2=PO_2H$.

EXAMPLE 4

100 parts of anhydrous crystallised phosphoric acid are broken to a coarse form and then gradually intermixed with 180 parts of epiguaiacoline (=guaiacol ether of the epihydrine alcohol, B. P. at 12 mm. 154–155° C., M. P. 42° C.). The addition and mixing is so regulated that the strong exothermic reaction does not take place in a too stormy manner and that the temperature does not substantially rise over 100° C. The reaction being completed, the reaction mixture is stirred with ice-cold water, then dissolved by addition of caustic soda lye up to alkaline reaction and any present small quantities of neutral substance (guaiacoline) are removed by extraction. From the solution thus purified mineral acid precipitates the free monoguaiacoline phosphoric acid ester. The compound constitutes, in a water-containing condition, a vitreous-viscous mass which reacts as a di-basic acid and whose alkali salts (the acid ones as well as the stoichiometrical neutral salts) are easily soluble, whilst the other ones such as the earth-alkali metal and the heavy metal salts are for the most part insoluble.

The same substance is obtained by causing monoguaiacoline (B. P. at 3 mm. 183–184° C.) to react with at least the equimolecular quantity of phosphorus pentoxide or of phosphorus oxychloride in presence of a tertiary base and, if desired, of an inert diluent, then working up the reaction mixture as described in the foregoing examples.

If, on the contrary, more than the equimolecular quantity of epiguaiacoline is caused to rapidly react with phosphoric acid (or if less than an equivalent of phosphorus oxychloride or phosphorus pentoxide is reacted with monoguaiacoline) there is obtained, according to the proportions and the other operative conditions, more or less prevailingly or exclusively the secondary ester, the bis-(guaiacyl)-phosphoric acid, which, as it could be expected, shows the behaviour of a monobasic acid and gives only one series of salts. The alkali salts are soluble in water.

In the same manner as epiguaiacoline the corresponding ethoxy compound, the epi-aiacoline (made from epichlorhydrine and the potassium salt of the o-ethoxy-phenol or "aiacol," B. P. at 14 mm. 97–98° C.) also reacts with the phosphoric acid and thus produces the monoaiacoline phosphoric acid ester. The same compound is also obtained by causing phosphorus pentoxide (or phosphorus oxychloride with subsequent hydrolysis of the at first formed ester-dichloride to react with monoaiacoline (o-ethoxyphenol-glycerol-ether, B. P. at 2 mm. 178–180° C.).

EXAMPLE 5

Into 90 parts of phosphorus oxychloride there are introduced, while stirring, at 0° C., within 3 hours, 60 parts of 1:3-bis-(2'-methoxy-phenoxy)-propanol-2 ("diguaiacoline," M. P. 77° C.). Then stirring is continued for still some hours, while cooling, for 12 hours without cooling and finally for 3 hours at 40–50° C. and the excess of phosphorus oxychloride is then distilled off in vacuo at this temperature, whereby 80 parts of intermediate product remain back. The latter is introduced into 250 parts of finely broken ice, and 110 parts of caustic soda lye of 8 per cent strength and then 63 parts of sodium carbonate are added thereto. The mixture is stirred or shaken for several hours, the non-dissolved matter is separated from the aqueous solution of the reaction product and the said solution is cooled by means of ice. By gradually adding ice-cold hydrochloric acid thereto, there are precipitated out about 60 parts of the desired product. Thus the primary phosphoric acid ester is obtained in an excellent yield in form of white crystals which dissolve in water and in alcohols with a strong acid reaction. By neutralising the solutions with bases, for example with sodium hydroxide, potassium hydroxide, amines, and subsequent concentrating, for example evaporating in vacuo, the salts are obtained.

The compound, which is a preferred product according to the invention, shows the behaviour of a di-basic acid, it is practically free from secondary ester. (1 g. of substance consumes 50.95 cc. of $n/10$ base for the neutralisation with respect to phenolphthaleine. For the primary ester of the molecular weight of 384 1 g. of substance needs 52.10 cc. of base for the neutralisation. The monobasic secondary ester of the molecular weight of 670 would need only 15 cc. of $n/10$ base for 1 g. of substance).

Ethylguaiacoline (1 - ethoxy - 3 -(2'-methoxyphenoxy)-propanol-2, B. P. 176–177° C.), allyl-guaiacoline (1 - propenoxy - 3-(2'-methoxyphenoxy)-propanol-2), diaiacoline and similar diethers of the glycerol react in the same manner as di-guaiacoline.

Instead of the phosphorus oxychloride used in the Examples 1 and 2 phosphoric acid anhydride, meta- or pyrophosphoric acid or mixtures of the anhydro-derivatives of the phosphoric acid may also be used.

Moreover, as starting materials for the above reaction the further glycerol di-ethers mentioned or described in the copending patent application Ser. No. 369,354 (Patent No. 2,343,053) of the same applicant may also be used.

What I claim is:

The phosphoric acid ester of glycerol-di-(o-methoxyphenyl)ether of the formula

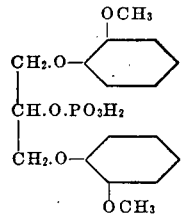

ADOLF GRÜN.